May 10, 1927.
C. A. WARE ET AL
1,627,587
NONSKID CHAIN
Filed Jan. 8, 1926
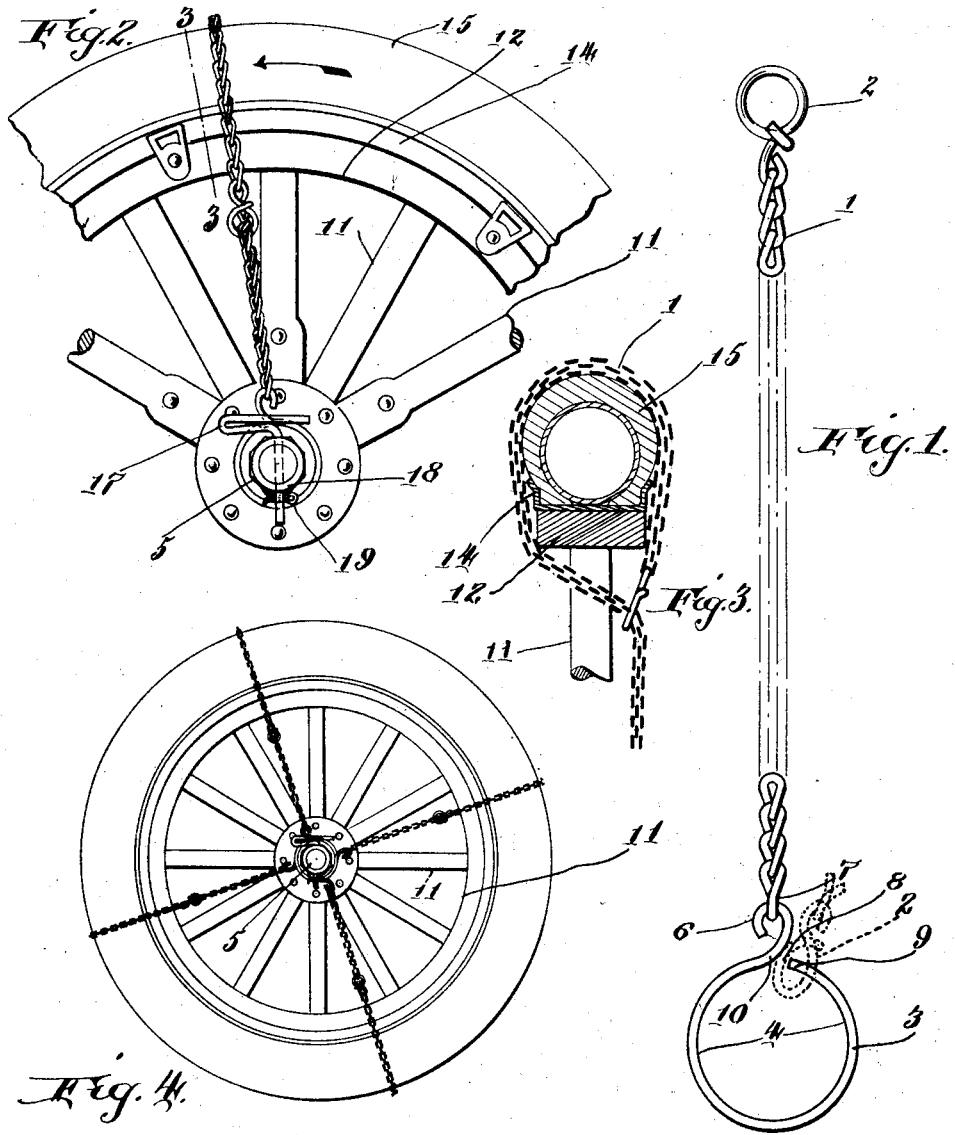

Patented May 10, 1927.

1,627,587

UNITED STATES PATENT OFFICE.

CHARLES A. WARE AND ALWIN DEICHMILLER, OF PASADENA, MARYLAND.

NONSKID CHAIN.

Application filed January 8, 1926. Serial No. 80,070.

The present invention relates to a chain which may be made in three, four or any convenient number of units up to seven or eight, each unit comprising a single chain which may be separately applied. These chains are spaced by substantially equal arcs to suit the convenience of the device, and they may be applied without jacking up or turning the wheel. The fact that the chains are separate and independent units not only contributes to the convenience of the user in applying them but makes it feasible to use just as many or just as few units as running conditions may warrant, it being a well-known fact that the variety of conditions presented in operation involve quite a variation in the tendency to skid and in the necessity for preventive measures of this sort. Each unit comprises a chain of sufficient length to extend in a radial plane including the axis about the short circumference of the tire, rim and felly in addition to the length of the radius from the centre of the wheel to the felly, and in the preferred form there may be a few links in excess of this length.

In addition to this each unit or individual chain is formed with an eye at one end large enough so that the chain may be passed therethrough and a fastening at the other end adapted to be engaged with the projecting portion of the hub or hub cap to fasten the chain at the centre of the wheel.

The fastening in the preferred form is a hook and is shown as a double hook or S, both sides of the hook being open, and the small end of the hook being small enough to pass through the eye.

In operation the end of the chain having the eye is passed around the tire, rim and felly at the most accessible point. The other end of the chain is then passed through the eye and engaged with the hub. As many chains as may be needed are applied preferably without jacking or turning the wheel. These are spaced at convenient distances along the tire and rim.

The hook referred to above may be passed through the eye and hooked over the hub. Any preferred number, from one to seven, may be applied in this way, and when all of the chains which are to be used, have been hooked over the hub, a pin or other fastening means is passed through the hub cap to hold the hooks in position. The chain as applied in this way is most securely fastened, the loop or eye giving a cramping effect, so that there is very little pull at the centre of the wheel. At the same time the chain has a certain amount of creep which prevents wearing the tire and it does not rattle or become disengaged. Also, the length of the chain may be adjusted to different tires and wheels by engaging the hook with different links of the chain, the wire of which the hook is made and the links being proportioned to provide for this function.

In the accompanying drawing we have illustrated a chain embodying the features of our invention in the preferred form and an automobile wheel to which the chain is applied.

In the drawing—

Figure 1 is an elevation of the chain ready for application to a wheel. This is a single unit.

Figure 2 is a fragmentary side elevation of a wheel to which the chain is applied.

Figure 3 is a cross-section on the line 3—3 of Figure 2 showing the manner of looping the chain around the tire, rim and felly.

Figure 4 is an elevation of a wheel with four of the non-skid chains or units in position.

Referring to the drawings by numerals, each of which is used to indicate the same or similar parts in the different figures, the non-skid chain unit as shown in Figure 1 comprises a piece 1 of chain, of a length sufficient to encompass the tire, rim and felly, and in addition thereto a little less than the radius of the wheel inside the rim, to which, in the preferred form of the invention, two or three links are added for purposes of adjustment. This unit or chain is provided at one end with an eye 2 of rigid construction so as to stand any stress which can be put upon the chain, and of sufficient size so that the chain may be passed freely through it. At the other end is an open loop or hook 3, the opening 4 in the hook or loop being of sufficient size to pass over or encompass the projecting portion of the hub or hub cap 5. This hook or loop may be fastened to the chain in any suitable manner.

In the preferred form, as shown, it is a double hook or S having a second hook member or eye 6 which is hooked through or engaged with a link 7 at or near the end of the chain. This fastening, secondary hook or eye 6 of whatever type should be as strong as the chain and small enough to pass through the eye 2, and the opening or space 8 between the point 9 and the shank 10 leading to the opening 4 of the large hook, must be large enough to pass the wire or other material forming the eye 2, which for purposes of illustration is shown in position, passing through this opening and encompassing the point of the hook.

In applying the chain, the point 9 of the hook is passed through the eye 2, the chain having been already looped around the tire, rim and felly, as above described, and the entire hook with the fastening 6 and the chain 1 is led through the eye, as aforesaid, the hook being in turn passed over the hub cap.

Figures 2, 3 and 4 illustrate a wheel comprising spokes 11, felly 12, rim 14 and tire 15. Figure 2 is fragmentary and shows a single unit or chain in position, the loop or eye 3 being locked or otherwise held in position on the hub against displacement by means of a pin 17 which is passed through a suitable hole 18 in the hub cap bored for this purpose, the pin 17 being in turn held by a small cotter 19. Figure 4 shows four chains in position, though any number may be used, each of the hooks being in turn passed over the hub which will hold as many as seven or eight if desired, and if conditions require it, a longer hub cap which will hold as many chains as may be necessary can be used.

The secondary hook 6 shown in Figure 1 for connecting the end hook or loop 3 to the chain is adapted to be passed through any link of the chain for purposes of adjustment, but any preferred form of fastening may be used.

The improvement provides a chain consisting of independent elements each of which is looped about the tire, rim and felly at one end and fastened at the other end at the centre of the wheel independently of the other elements.

We have thus described specifically and in detail a single embodiment of our invention in order that the nature and operation of the same may be clearly understood; however, the specific terms herein are used descriptively rather than in a limiting sense, the scope of the invention being described and defined in the claims.

What we claim and desire to secure by Letters Patent is:

1. A non-skid device for motor vehicles consisting of a plurality of separate units, each unit comprising a separate chain having a loop at one end adapted to encircle the hub and an eye at the other end of a size to pass the chain, the loop in connection with each unit being separate from the loops of the other units and means for holding said loops on the hub.

2. A non-skid chain for motor vehicles consisting of separate units, each unit comprising a chain having a hook at one end adapted to engage and encircle the hub and an eye at the other end of a size to pass the chain, the hook having means for engaging any one of several different links of the chain providing for adjustment as to the length of the chain.

3. A non-skid chain for motor vehicles consisting of separate units, each unit comprising a chain having a hook at one end adapted to engage the hub, and an eye at the other end of a size to pass the chain and hook, the hook having its point spaced away from the shank to admit the eye and provide for the passage of the hook and chain through the eye.

4. A non-skid chain for motor vehicles consisting of separate units, each unit comprising a chain having a hook at one end adapted to engage the hub, and an eye at the other end of a size to pass the chain and hook, the hook having means for engaging the chain in the form of a second smaller hook member adapted to be passed through any one of several links of the chain and also of such a size as to pass with the hook shank through the eye.

Signed by us at Pasadena, Md., this 2nd day of January, 1926.

CHARLES A. WARE.
ALWIN DEICHMILLER.